April 4, 1950   H. CHRISTENSEN   2,502,706
SAW SETTING DEVICE
Filed April 14, 1948   2 Sheets-Sheet 1
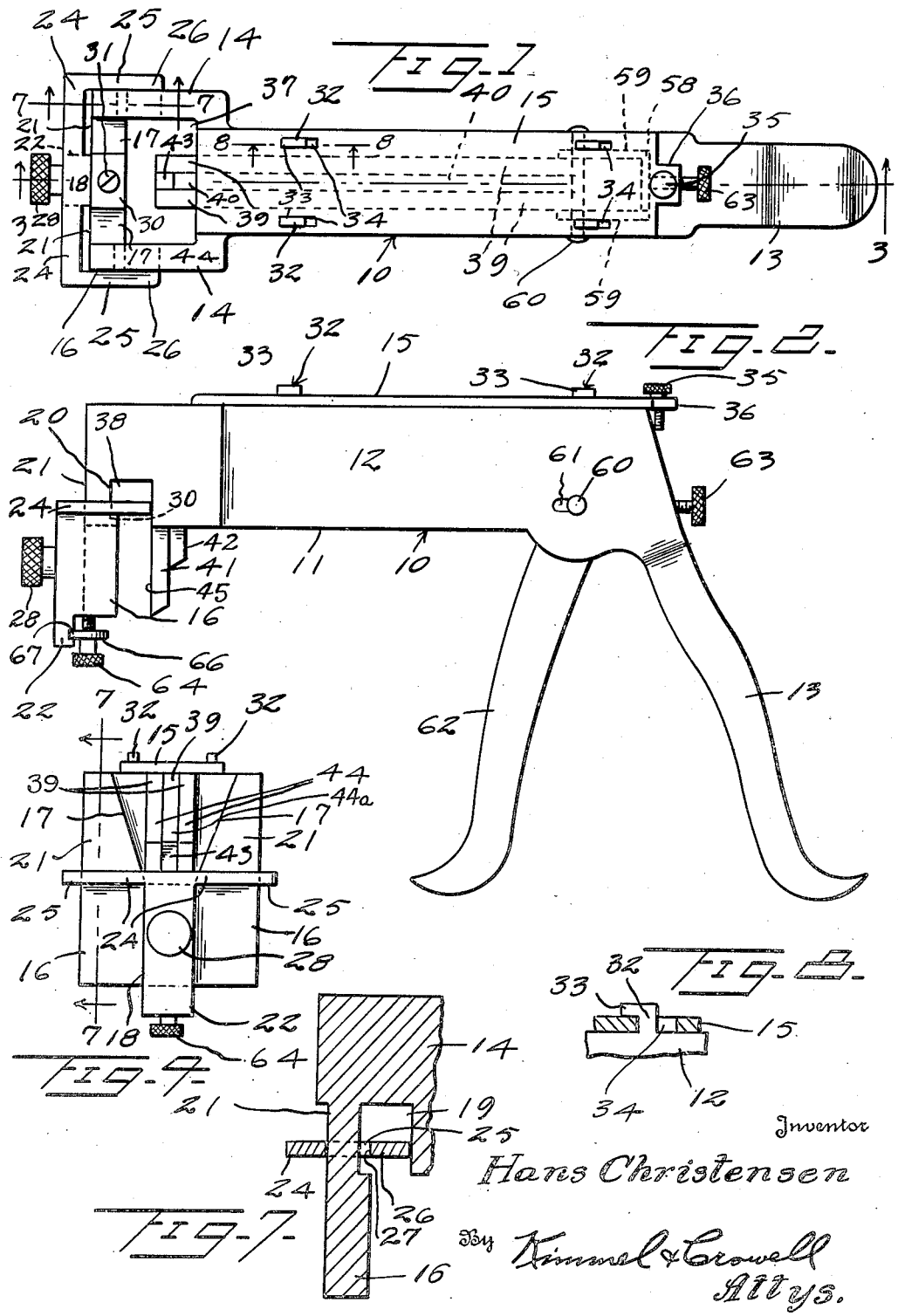
Inventor
Hans Christensen
By Kimmel & Crowell
Attys.

April 4, 1950  H. CHRISTENSEN  2,502,706
SAW SETTING DEVICE
Filed April 14, 1948  2 Sheets-Sheet 2
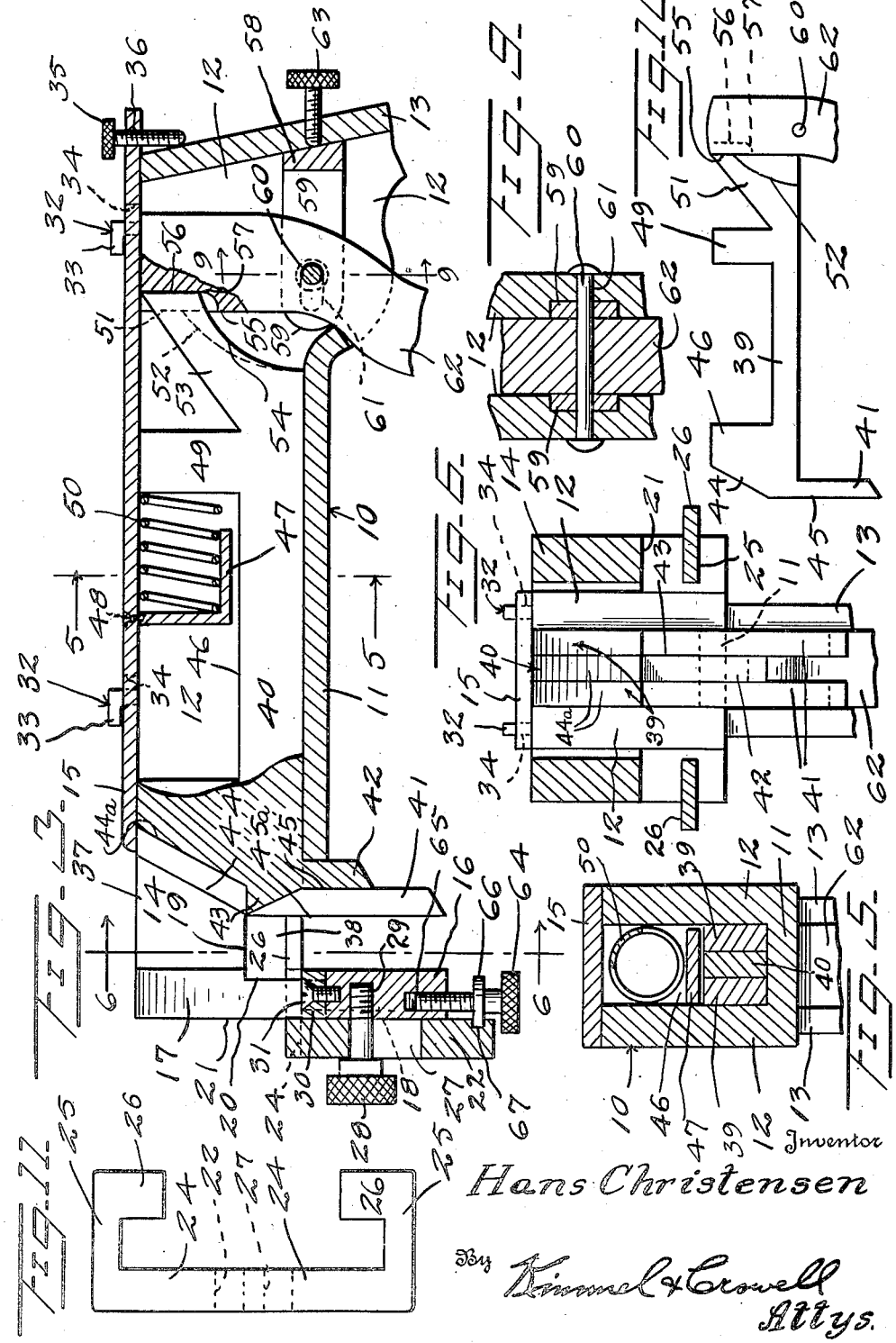
Inventor
Hans Christensen
By Kimmel & Crowell
Attys.

Patented Apr. 4, 1950

2,502,706

UNITED STATES PATENT OFFICE 2,502,706

SAW SETTING DEVICE

Hans Christensen, Salem, Oreg.

Application April 14, 1948, Serial No. 20,951

4 Claims. (Cl. 76—69)

My invention relates to saw setting devices or tools and an object thereof is to provide a simple, novel and practical lightweight but strong and efficient tool device for setting the teeth of saws of different types and sizes accurately and evenly while preventing the saw from getting crimped, crooked or bent by the setting operation.

In order to accurately set a saw, it must be straight and even or no saw set can impart to it an even set, or if the saw teeth are long on one side of the saw and short on the other, it should not be set in this condition as the long teeth on one side would, because of their greater length have more set than the shorter ones on the other side and the saw would not cut a straight line. Therefore, the saw should first be straightened and evened, then jointed and filed to a near point, the teeth set and the filing completed. If a saw is straight and even it needs only a slight jointing and may be set immediately after being jointed. Different types, thicknesses and sizes of saws and teeth require different saw setting points or interchangeable sets with points at different angles or angular degrees to cooperate with the square or right angular edge of the setting anvil or block, and an adjustable saw rest or slide by means of which a saw can always be adjusted with the base line of the teeth even with the setting edge of the anvil or lower, this preventing the saw from getting crimped, crooked or bent by the setting operation and properly cooperating different saw setting points to give different setting for different saws and teeth as needs may require.

It is therefore an object of the invention to provide a saw setting device having an adjustable saw setting guide or rest for adjustment according to the setting point used and render it possible to use several different setting points or movable parts carrying or having the points, of different sizes and lengths which are interchangeable, to give different settings for different saws and teeth.

Another object is to provide simple and novel means in the form of a plural part or sectional clamp and correlated tooth setting member for dually clamping and varying or adjusting the clamping pressure against the saw for different thicknesses of saw blades and simultaneously moving the set to set the teeth in proper timed sequence or relation with a delayed action so as to prevent the action of the set on the teeth before the saw is properly clamped and held firmly and closely as well as accurately against the saw or teeth setting anvil, thus securing extremely accurate set in the saw by preventing the force applied to the saw teeth in the setting operation from spending itself over a large area of the saw and causing uneven setting to be imparted to the saw teeth.

A further object is to provide novel means including a housing which makes provision for the use of several clamping elements and setting points of various proportions, sizes and degrees of angle or bevel and movement for different types or styles and thicknesses and sizes of saws or saw blades and teeth and degree of set required by the latter, by rendering said elements and points removable or replaceable and interchangeable with provision for quick changes thereof, thus increasing the saw setting range or capacity of the device universally adapted for various saws.

Another object is to provide readily removable and replaceable movable saw clamping and setting members or plungers, the latter having or being formed with setting points, thereby providing for quick change of setting points angled or beveled at different degrees for bending and setting the saw teeth at the desired or required degree or angle over the square edge of the stationary setting anvil or block to quickly and uniformly set the teeth of any saw.

A still further object is to provide an adjustable saw rest or slide constituting a gage against which the saw abuts and by which the saw may be adjusted vertically with respect to the extent of the teeth and by means of which a saw can always be adjusted with the base line of the teeth even with the setting edge of the anvil cooperating therewith or lower, thus preventing the saw from getting crimped, crooked or bent by the setting operation.

With the above and other objects in view, my invention consists in the arrangement, combination and details of construction disclosed in the drawings and specification, and then more particularly pointed out in the appended claims.

In the drawings,

Figure 1 is a top plan view of a saw setting device or tool embodying the invention, Figure 2 is a side elevation of the device as shown in Figure 1, Figure 3 is a longitudinal section taken on the line 3—3 of Figure 1, Figure 4 is a front elevation, Figures 5 and 6 are sectional views taken on the lines 5—5 and 6—6 of Figure 3, Figures 7 and 8 are fragmentary detailed sections taken on the line 7—7 and 8—8 of Figure 1, Figure 9 is a fragmentary detailed section taken on the line 9—9 of Figure 3, Figure 10 is a fragmentary detailed side elevation showing a clamp member and cooperating handle engaging part or cam; and Figure 11 is a detailed plan of an adjustable sliding saw rest by means of which saws may be placed in proper adjustment with relation to the setting anvil or block.

Referring to the drawings in detail, the saw setting device or tool is shown as comprising a main body 10 in the form of a hollow housing or barrel which is shown with the longitudinal axis arranged horizontally in the drawings and of channel or U-shaped cross section with the open side at the top. This body has a bottom bight or connecting portion or wall 11, side walls 12 parallel to each other, and a handle 13 at the rear end extending downwardly and rearwardly in an inclined position. The front end of the body is formed with a fork or outwardly offset spaced side extensions 14 outwardly of the sides 12 so that the front end is slightly wider than the body in the rear thereof, the open side or top of the body is closed by a removable lid or cover plate 15 engaging on the top edges of the side walls 12 and suitably secured in position so that it may be readily removed for access to the interior of the body or housing.

At the front end, the offset side extensions 14 are provided with a depending front wall 16 extending considerably below the body and provided with an upwardly opening notch at the top having oppositely beveled or inclined and downwardly converging side walls 17 with a vertical groove 18 in the front, forming a connecting portion between the opposite sides of the wall 16, with parallel sides, the groove being of uniform width beneath the inclined portions 17. The extensions 14 are provided with recesses 19 at the bottom spaced from the front ends of the extensions 14 and provided with recesses 20 extending through the wall 16 at the front of the opening or recess 19 and in the rear face of the wall 16 and terminating substantially at the bottom edges of the housing, side walls 12 and extensions 14. A transverse recess or cut back 21 is also provided in and across the front face of the wall 16 at the top above the vertical groove 18 substantially in horizontal alignment with the recess 20 in the back face and extending above the same at and to the top of outwardly offset sides or extensions 14 to more readily admit light for observation. The extensions 14 thus form a substantially U-shaped member in which the recess 19 forms an opening extending through the bottom wall 11 and a clearance through the device between the front ends of the bottom and cover 11 and 15 respectively, and the wall 16. A movable and adjustable slide or saw rest 22 is mounted in the recess 18 in the front of the wall 16 and is also movable vertically in the recess or cut back 21 at the top of the front faces of the sides or extensions 14 with the lower depending portion of the slide 22 of uniform width and fitting within the corresponding recess 18 for movement therealong. The slide 22 is formed of an elongated depending bar engaging as noted above in the recess 18, and having a pair of opposed extensions 24 extending laterally from the top end thereof. Right angular portions 25 extend from the outer ends of the extensions 24 and engage around the outer edges of the wall 16. Inturned extremities 26 are formed on the ends of the portions 25 and extend into the recesses 19 for movement therein. The extensions 24, portions 25 and inturned extremities provide a C-shaped head 23 on the slide. The slide 22 is provided with a longitudinal slot 27 through which a thumb screw 28 extends to engage a threaded socket 29 in the wall 16 to clamp the slide 22 in adjusted position. A setting anvil or block 30 is mounted on the top of the wall 16, see Figures 1 and 3, and corresponds in width to the width of the hollow portion of the housing 10 between the inner faces of the side walls 12 thereof and is held in position by suitable means such as a screw 31 extending down through the anvil and into the wall 16 into which it is threaded as shown more particularly in Figure 3 of the drawings. This setting anvil is preferably of hardened steel or alloy so as to give a sharp corner edge and maintain such condition in continued use of the device in setting saw teeth.

As previously stated, the bottom wall 11 terminates in spaced relation to the rear face of the depending front wall 16 and the front edge of the cover 15 terminates slightly rearwardly thereof. While the cover 15 may be removably secured in position in any desirable way, it is shown secured by L-shaped clips or headed lugs 32 projecting upwardly from the top edges of the side walls 12 in alignment longitudinally and transversely and arranged in pairs near the front and back ends of the cover and formed with forwardly offset heads 33 preferably extending horizontally. These clips or lugs engage correspondingly arranged slots 34 in the cover plate 15 and thus, by sliding the cover or lid forwardly, the heads 33 may readily pass through the slots 34 so as to displace or remove the cover with respect to the housing to obtain access to the interior of the latter. The cover is correspondingly placed in position and then shifted rearwardly so that the rear ends of the slots 34 are offset from the shanks of the lugs or clips 32 and the forward edge portions of the cover plate at the slots 34 lie beneath the extensions or heads 33 to retain the cover from displacement upwardly. In order to retain the cover in position, a thumb screw 35 is threaded through a hole in the rear end of the cover 15 which may be in the form of a reduced central lug or extension 36 having a threaded hole therethrough so that the screw will engage behind the rear face of the connecting portion of the stationary handle 13 and retain the cover in its fastening position. It may be here mentioned that the handle 13 is also of hollowed U-shaped or channel cross section to further carry out the lightweight of the tool while producing the necessary strength.

By reason of the offset 14 at the front end of the housing, the opening having the inclined sides 17 and the recess 19 extending through said sides 14 in rear of the front wall 16, a sight opening 37 is provided through the tool in rear of the wall 16 and setting anvil or block 30 and the openings or recesses 19 and 20 produce an enlarged transverse opening 38 above the anvil and between the front end of the housing and upper portion of the wall 16 above the anvil 30 so that complete access and observation of the operation of the device is permitted while the recess 20 provides clearance for the teeth of the saw after they are set to provide free and unobstructed passage of the saw teeth after having been set.

The body or housing 10 is adapted to receive a plurality, preferably two movable clamp members, plungers or bars 39 which are formed of flat stock and constitute a clamping means or device for holding the saw blade against the rear face of the wall 16 and anvil or block 30. Positioned between the clamps or clamp bars 39 is a saw setting plunger, member or bar 40 also of flat plate stock and normally positioned rearwardly of the clamp bars or plates 39 at the front, which latter are provided at their forward ends with depending saw engaging members or extensions 41 at the front end while the setting bar 40 is provided with a similar depending end 42 but considerably shorter than and set back the thickness and to the rear edges of the members 41 and all preferably beveled or inclined forwardly at the bottom edges thereof. These members 41 and 42 are formed as extensions on the bars 39 and 40 to extend in front of the front edge of the bottom wall 11 and an opening provided in the latter between said end and the anvil 30 for movement therein and in the opening 38. The setting bar 40 is also provided with a forwardly extending setting point or saw set 43 at the lower end of a forwardly inclined or beveled upper forward edge portion 44 thereof and above and projecting forwardly of the front edge of portion 42 with its outer point or apex substantially in line with the front edge of portion 41 so as not to protrude therefrom and so that the top of the point 43 is slightly below the upper ends of the recesses 19 and 20 and the front edge is beveled or inclined rearwardly to the nose 45 or front edge of the bar 40 at the juncture of the extension 42 therewith a similarly beveled portion 44a extended from the front edges of clamping extensions 41 of the clamping bars 39, while portions 45a of plates 41 are positioned in substantially perpendicular relation to the inner face of the setting anvil or block 30. The extensions or members 41 serve to stop the forward movement of members 39 and 40 when engaged with the saw blade to clamp same against the rear or inner face of wall 16, while extension 42 serves to stop the setting point 43 at the proper limit to set the teeth against the inner upper corner and edge of the anvil or block 30 at the proper angle, and may, but not preferably also form limit members to check the rearward sliding movement of the reciprocable clamping and setting bars at the front end of wall 11. However, this latter function is preferably performed by other parts, as by the engagement of an operating handle or lever with the rear end of wall 11 as will be later described. The bars are thus correspondingly formed except that the extension or member 42 is shorter than the extensions or members 41, and bars 39 are bereft of the point 43 in addition to being set back to the rear edge of part 41 with the point 43 set back to the front edge of part 41 and upper edges 44 of bar 40 set back from the corresponding edges 44 of bars 39 the thickness of part 41. All of the bars are provided in their top edges with elongated recesses 46 of right angular formation adapted to permit the bars to move under a spring holder or retaining member 47 of L-shaped form and tubular cross section if desired, held against the bottom face of the cover 15 in any suitable way as by a fastening screw 48. Rearwardly of the recesses 46, the bars 39 and 40 are formed with vertical lugs 49 forming the rear ends of the recesses 46 and a compression spring 50 is seated on the holder 47 against the front thereof to engage the lugs 49 and normally project or slide the bars rearwardly in the housing in their facewise relation to each other so as to occupy the interior space of the housing upon the bottom wall or bight 11 and between the inner faces of the side walls 12. Rearwardly of the lugs 49, the bars 39 and 40 are formed with forwardly inclined and upwardly and rearwardly extending arms, the arms 51 of the bars 39 having concave bottom edges 52 and corresponding arm 53 of the bar 40 having a similar concave bottom edge 54 slightly lower than the edge 52 owing to the fact that the width or height of the arm 53 is greater than that of the arm 51 and the arm 53 is slightly longer than the arm 51 so as to extend slightly farther to the rear and all have rear edges at right angles to the longitudinal axis of the housing 10. The arms 51 are designed to constantly engage the upper front edge 55 while the arm 53 is adapted to extend into and constantly engage the back wall of a recess 56 centrally positioned transversely between the edge portions 55 like the bar 40 is positioned between the bars 39 and forming camming surfaces or cams having concave bottom ends 57. A U-shaped frame 58 is disposed horizontally within the sides 12 of body 10 and enlarged portions of V or channel shaped handle 13 at the top and in front of the bight or rear connecting wall and sides of the stationary handle 13 so as to set in the connecting or bight portion between its sides or flanges which extend forwardly and this frame is provided with horizontally disposed sides or legs 59 for mounting a transverse horizontal pivot pin 60 through elongated openings or slots 61 in the side walls 12 of the housing 10. An obtuse angled operating lever or handle 62 is pivoted on the pin 60 with its lower long arm extending forwardly and offset rearwardly at the pivot or fulcrum 60 with its short upper arm upright or extending into the rear portion of the body 10 adjacent and spaced from the rear or bight portion of handle 13, and is adapted to be shifted by moving the pivot pin 60 in the slots 61 so that the relation of the upper short arm or upwardly extending end of the lever or handle 62, provided with the front camming edges 55 and 56, the latter formed as a recess therein and set back from the edge 55 for engagement with the rear ends of the arms 51 and 53 respectively, may be properly related. For this purpose, plunger bar or member 40 and arm 53 exceed the members 39 and arms 51 respectively, in length the depth of the recess 56 so that the rear end of arm 53 will extend into and engage the back recess 56 while the rear end of arm 51 engages the front edge or edges of the short upper arm of the lever 62 and because of the constant contact with the three bars 39 and 40 at these points, rearward movement of the lower part of the handle or lever 62 at the bottom below and on the pivot 60 will cause upper part or arm to move forwardly and simultaneously move all three members 39 and 40 forwardly therewith, but the bars 39 will engage the saw blade first at the forward or nose edges 45 of members 39 and 41 so as to stand at rest when touching or engaging and clamping the saw blade if and when the parts of the device are properly set. Assuming that the saw set is properly adjusted, bars 39 will move no further forwardly except to tighten against and clamp the saw and hold it in position flat against the rear face of the wall or jaw 16 from movement in an exactly accurate or vertical position for proper setting of the saw teeth by bending the same forwardly of the tool or laterally of the saw blade and plane thereof over the top inner corner edge of the setting anvil or block. That is, if the saw set is properly adjusted, when the forward ends 45 of bars 39 and portions 41 have engaged the saw at this point of the advanced or forward movement of the upper part or short arm of the lever 62, the upper end thereof will enter beneath the arm 51 at curve 52 and, as front or cam edges 55 clear the rear vertical ends of arms 51, and by engaging frictionally therewith and thereagainst hold jaws 41 and bars 39 in saw clamping and holding position so that it will not get loose or shift when a tooth is being bent, swaged or set. Curved bottom edge 52 is of the same segmental circumference or arc described by the upper part or end of the handle 62, while continued engagement of the cam or edge 56 with the broader rear or inner end of arm 53 of bar 40 and lower arcuate or curved lower edge 54, the bar 40 will continue to move forwardly or outwardly to cause point 43 to continue to move therewith after engaging a tooth to bend and complete the setting operation. After each tooth is set, the rearward or gripping pressure on the movable or swingable lever or handle with the rear stationary handle 13 is released and spring 50 will reverse the movement and operation and move bars 39 and 40 rearwardly to release the saw or blade, and set teeth thereof at point 43, to swing the upper part of lever 62 rearwardly and the lower part thereof forwardly limited or stopped at the proper point in released position by the termination of the rear bottom opening at its front edge or rear end of wall 11 where the pivoted handle or lever 62 extends through the bottom of the body or casing. To accomplish this, a thumb screw 63 is threaded horizontally through the handle 13 at its bight portion with or against the bight portion 58 of the U-frame carrying the pin 60 so as to slide said frame and the pivot pin together with the handle or lever 62 carried thereby forwardly or rearwardly to vary the forward movement imparted to the clamps and setting members 39 and 40 respectively and thus of the setting point 43 on the latter. In order to raise or lower the slide 22, an adjusting screw 64 is threaded in a socket 65 in the lower end of the wall 16 adjacent the rear face of the slide and this set screw is provided with an annular flange 66 engaging a concentric arcuate recess 67 in the rear face of the slide 22 so that by turning the set screw 64, vertical movement up or down may be imparted to the slide to adjust it to the proper position.

In the use and operation of the device, the saw is first checked or made straight and even at the teeth, jointed and filed to a near point, placed and clamped in a vise with the saw teeth at the top and the set applied at the opening or bottom recess between wall 16 and edges 45 of bars 39 and 40, and parts, noses or jaws 41 and 42 thereof. The thumb screw 28 is then loosened and the slide 22 is raised or moved up or down by the adjusting or set screw 64 according to the height of the saw teeth in the opening 38 and with respect to the inner upper top or corner edge of the setting anvil or block 30. The thumb screw 63 is then loosened and the frame 58 moved horizontally either forwardly or rearwardly so that the saw setting point 43 of the saw set member or bar 40, as well as the clamping bars 39 and handle 62, are moved to the proper position to secure the necessary adjustment for the saw thickness or thickness of the blade thereof, and the thumb screw tightened. The handle or lever 62 is then swung rearwardly to move clamping bars 39 forwardly by constant engagement of the cams or edges 55 with the rear ends of the arms 51 and the two clamping bars 39 of the two-piece clamping device moved against the saw blade until stopped and this movement of lever 62 with the cam edge at the recess 56 in constant engagement with the rear edge of the arm 53 of the setting bar 40 simultaneously causes the nose 45 of bar 40 and jaw 42 to engage a saw blade at the inner or rear face of wall or jaw 16 and setting point 43 to press and bend a tooth in setting position against the anvil 30, thus setting the saw tooth by swaging or setting the saw tooth forwardly. This action of the handle or lever 62 is effected against the action of the spring 50 normally tending to displace the bars 39 and 40 rearwardly away from the jaw 16 and saw against the upper part of lever or handle 62 and the lower part of handle 62 forwardly away from the stationary handle 13 limited by the rear end of wall 11, and when the pressure on the handle 62 tending to move or swing it rearwardly on its pivot 60 is released, the handle is automatically returned to its normal forward position away from the handle 13 by the spring 50 in the housing 47 attached to the cover plate 15. At the same time, the spring 50 retracts the setting point 43 with its member or bar 40 and simultaneously releases the clamping ends of the clamping bars 39 from the saw blade so as to release the latter, together with the saw teeth thereof, of pressure after being set. The fact that the bar 40 is slightly longer than the bars 39 or arm 53 extends rearwardly further than the arm 51 the depth of the recess 56 and is slightly longer than the same, together with the fact that the rear ends of the arm 51 constantly engage the aligned front edges or camming surfaces 55 at the front edge of the upwardly projecting part or arm of the handle 62 causes the clamping members to engage the saw blade prior to the engagement of the setting point 43 with the teeth of the saw blade due to the constant engagement and action of the upper portion of lever 62 against the surface 56 and the latter against the rear edge of the arm 53, and the leverage at edges or cams 55 as compared to edges or cams 56 and bars 39 being stopped at the blade so that the saw is clamped in advance of the setting of the saw tooth by the point 43 by the simultaneous or delayed action or movement of the setting bar and point thus produced. In this way, it is assured that the saw blade will be properly clamped and tightly held prior to the setting operation, and assuming that the saw is straight and even and the saw blade will be properly clamped and tightly held prior to the setting operation, and assuming that the saw is straight and even and the saw teeth even and properly jointed and filed, proper setting of the teeth is accomplished while preventing the saw from getting crimped, crooked or bent by the setting operation. In this way, the teeth are all set at the same angle after being sure that the blade is straight and the teeth even without one being longer than the other or longer on one side than on the other, and properly jointed and filed to a near point so that when the setting operation is completed they are of uniformly, evenly and perfectly even and all set at the same angle on either side and the filing completed. It may also be mentioned that when the handle 62 is swung rearwardly to actuate the clamp members 39 and setting member 40, the latter will move forwardly when members 39 are moved forwardly to engage and clamp the saw, and when the clamping members 39 are in this position all movement will stop at this point if the saw set is too tightly adjusted. However, correct forward movement of the clamp bars 39 and set bar 40 and setting point 43 is effected after proper adjustment and the upper end of the lever 62 and cam 55 will have forward movement downwardly beneath the curved edge 52 at the lower and rear part of the arm 51, thus holding the clamping device immovable while the set bar 40 and point 43 moves forward to complete the setting operation by continued and subsequent action of the cam 56 with the rear end of the arm 53.

I do not mean to confine myself to the exact details of construction herein disclosed but claim all variations falling within the purview of the appended claims.

What I claim is:

1. A saw setting tool comprising a hollow housing having a fixed handle depending from one end thereof, a pair of spaced apart extensions formed on the other end of said housing, a front wall depending from the ends of said extensions, an upwardly opening notch formed centrally in said front wall, an anvil fixed in said notch, a slide movably carried by said front wall, portions of said slide being disposed to the rear of said front wall, means holding said slide in adjusted position relative to said anvil, a pair of spaced clamping bars slidable longitudinally in said housing, depending portions on the forward ends of said bars for clamping a saw blade against the rear surface of said front wall, a saw set bar disposed between said clamping bars and slidable in said housing, an inclined saw set on the forward end of said saw set bar, means normally urging said clamping and saw set bars away from said front wall, and actuating means engaging said clamping and saw set bars adapted to move said clamping bars into saw blade clamping position and subsequently move said saw set bar with said saw set cooperating with said anvil to set a tooth of a blade disposed therebetween.

2. A saw setting tool comprising a hollow elongated housing, a depending front wall at one end of said housing formed with an upwardly opening notch, an anvil secured in said notch, an opening in said housing to the rear of said front wall, a slide adjustably carried by said front wall, portions of said slide being disposed to the rear of said front wall for positioning the teeth of a saw blade relative to said anvil, clamping bars slidable longitudinally in said housing, projections depending from said clamping bars and extending through said opening for clamping a blade between said projections and the rear surface of said front wall, a saw set bar slidable in said housing, an inclined saw set on said saw set bar disposed to cooperate with said anvil to set the tooth of a clamped blade, means normally urging said clamping and saw set bars into retracted position remote from said front wall, and actuating means engaging said clamping and saw set bars and adapted to sequentially move said clamping bars into blade clamping position and subsequently move said saw set bar into tooth setting position.

3. A saw setting tool according to claim 2 wherein said clamping bars are formed with portions remote from said projections having surfaces at right angles to the direction of motion thereof, arcuate cam surfaces formed on the lower edges of said portions, and said actuating means includes a lever pivot means mounting said lever on said housing remote from said front wall, one end of said lever extending into said housing and engaging the adjacent end of said saw set bar and said surfaces of said clamping bar portions, pivoting said lever effecting movement of said clamping bars and saw set bars towards set front wall, extreme pivoting of said lever effecting engagement of said one end thereof with said arcuate cam surfaces and retaining said clamping bars in advanced position while further advancing said saw set bar.

4. A saw setting tool according to claim 3, wherein said pivot means is carried by a yoke movable longitudinally in said housing thereby providing for adjustment in the sequential advancement of said clamping and saw set bars.

HANS CHRISTENSEN.

REFERENCES CITED

The following references are of record in the file of this patent:

UNITED STATES PATENTS

| Number | Name | Date |
|---|---|---|
| 475,359 | Taintor | May 24, 1892 |
| 1,022,871 | Price | Apr. 9, 1912 |
| 1,470,694 | Meed | Oct. 16, 1923 |
| 1,887,350 | Harris | Nov. 8, 1932 |
| 1,928,975 | Felsman | Oct. 3, 1933 |
| 2,359,668 | Ogle | Oct. 3, 1944 |